US009787821B2

(12) United States Patent
Bender

(10) Patent No.: US 9,787,821 B2
(45) Date of Patent: Oct. 10, 2017

(54) SYSTEM AND METHOD FOR PROVIDING AN ALARM NOTIFICATION

(71) Applicant: BlackBerry Limited, Waterloo (CA)

(72) Inventor: Michael John Bender, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 32 days.

(21) Appl. No.: 13/790,250

(22) Filed: Mar. 8, 2013

(65) Prior Publication Data

US 2014/0253320 A1    Sep. 11, 2014

(51) Int. Cl.
| | | |
|---|---|---|
| *G08B 19/00* | (2006.01) | |
| *G08B 1/00* | (2006.01) | |
| *H04M 1/725* | (2006.01) | |

(52) U.S. Cl.
CPC ................ *H04M 1/72566* (2013.01)

(58) Field of Classification Search
CPC ............ G01C 21/3661; G01C 21/3688; B60R 16/0373; G06F 3/1454; G06F 17/30035; G06Q 10/10; G08B 3/10; G09G 2354/00; H04M 1/6075; H04N 21/4825
See application file for complete search history.

(56) References Cited

U.S. PATENT DOCUMENTS

| | | | |
|---|---|---|---|
| 5,576,685 A | 11/1996 | Saito | |
| 8,195,194 B1 | 6/2012 | Tseng | |
| 2002/0141291 A1* | 10/2002 | Articola | 368/262 |
| 2007/0001820 A1* | 1/2007 | Luo | G08B 21/24 340/309.7 |
| 2007/0083403 A1* | 4/2007 | Baldwin | G06Q 10/10 705/346 |
| 2010/0026510 A1* | 2/2010 | Kiani | A61B 5/1455 340/691.3 |
| 2011/0088086 A1* | 4/2011 | Swink et al. | 726/7 |
| 2011/0129201 A1* | 6/2011 | McLean | 386/296 |
| 2011/0163859 A1* | 7/2011 | Chraime et al. | 340/309.16 |

FOREIGN PATENT DOCUMENTS

WO    WO 2007/077534 A1    7/2007

OTHER PUBLICATIONS

Canadian Office Action dated Apr. 22, 2015 for Canadian application No. 2,843,998.
Summons to Attend Oral Proceedings for European Patent Application No. 13158375.9 dated Mar. 21, 2017.
European Office Action issued for European Patent Application No. 13158375.9 dated Dec. 4, 2015.

* cited by examiner

*Primary Examiner* — Brian Zimmerman
*Assistant Examiner* — Cal Eustaquio
(74) *Attorney, Agent, or Firm* — Thomas Grzesik; Fleit Gibbons Gutman Bongini & Bianco P.L.

(57) ABSTRACT

A system and method are provided for outputting alarm notifications. The method comprises: prior to activating an alarm on the electronic device, determining, from data stored on the electronic device, whether at least one of a predetermined type of event exists; and outputting a first modified alarm notification to indicate a relatively more urgent alarm if at least one of the predetermined type of event exists.

14 Claims, 5 Drawing Sheets

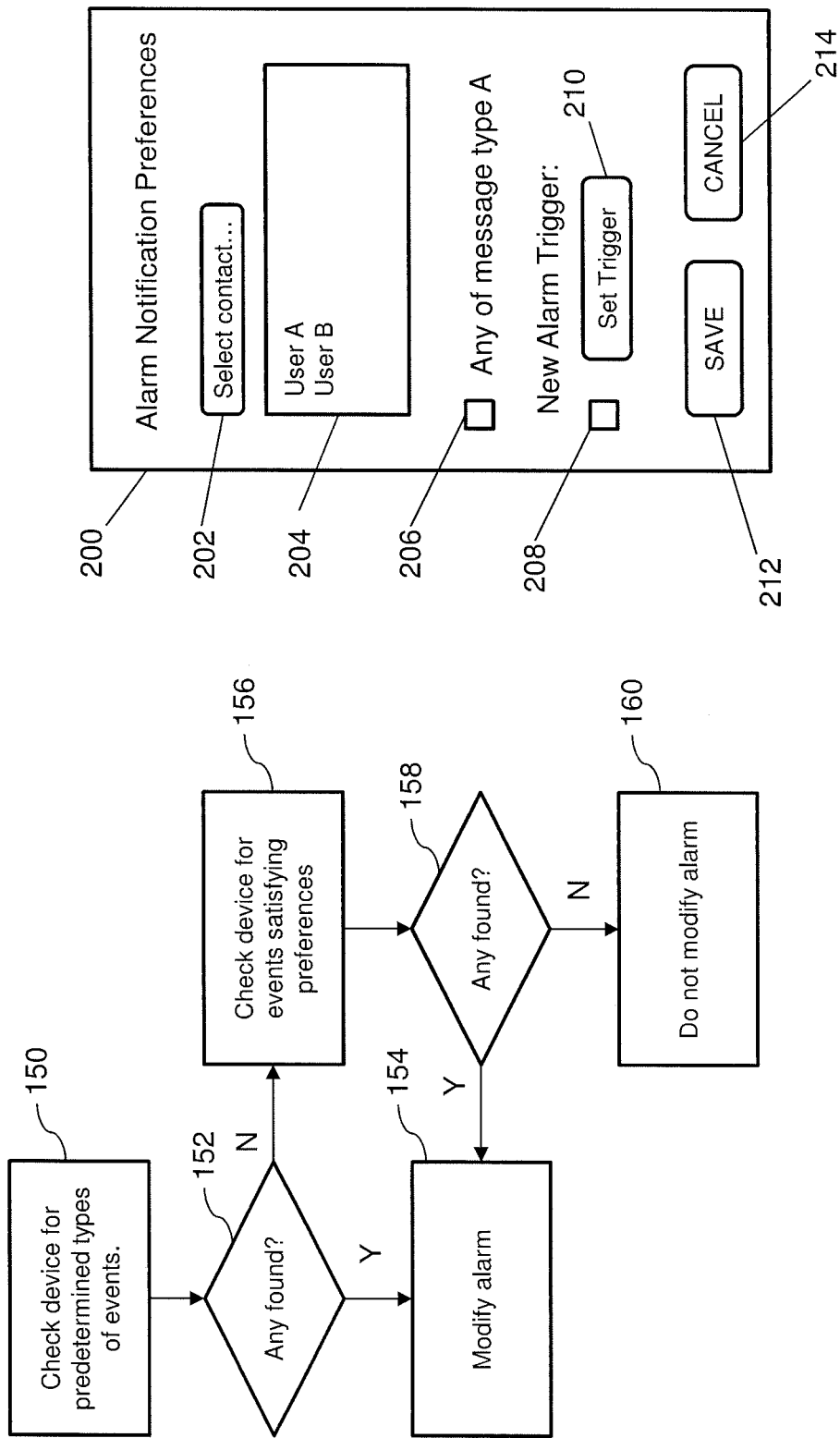

SYSTEM AND METHOD FOR PROVIDING AN ALARM NOTIFICATION

TECHNICAL FIELD

The following relates to systems and methods for providing an alarm notification.

DESCRIPTION OF THE RELATED ART

Electronic devices, particularly portable, handheld or otherwise "mobile" electronic devices are becoming increasingly important in organizing day to day events. In addition to organizing calendar appointments and having the ability to exchange communications, these mobile devices are often relied upon to provide timekeeping and alarm functions.

Users are typically able to select an alarm type (e.g., tone, chime, tune, etc.) from a list of multiple alarm types in order to customize their device. An alarm may also be configured to be triggered or activated on particular days, multiple alarms may be set within a particular day, and snooze functions may be provided to allow an alarm to be extended or deferred.

Despite the ability to customize an alarm on a mobile device, such alarms are typically independent of other features on the mobile device. Alarms that are used on a routine basis can also be difficult to distinguish from each other. For example, an alarm set for 6:00 AM on one day may be a general reminder to wake up, whereas the same alarm the next day may be a critical alarm to avoid missing an appointment, flight, or other event.

BRIEF DESCRIPTION OF THE DRAWINGS

Embodiments will now be described by way of example only with reference to the appended drawings wherein:

FIG. 5 is a flow diagram illustrating an example set of computer executable operations that may be performed in determining whether to modify an alarm notification;

FIG. 6 is a screen shot of an example of a user interface for selecting preferences for determining whether to modify an alarm notification.

DETAILED DESCRIPTION

Figure 2:
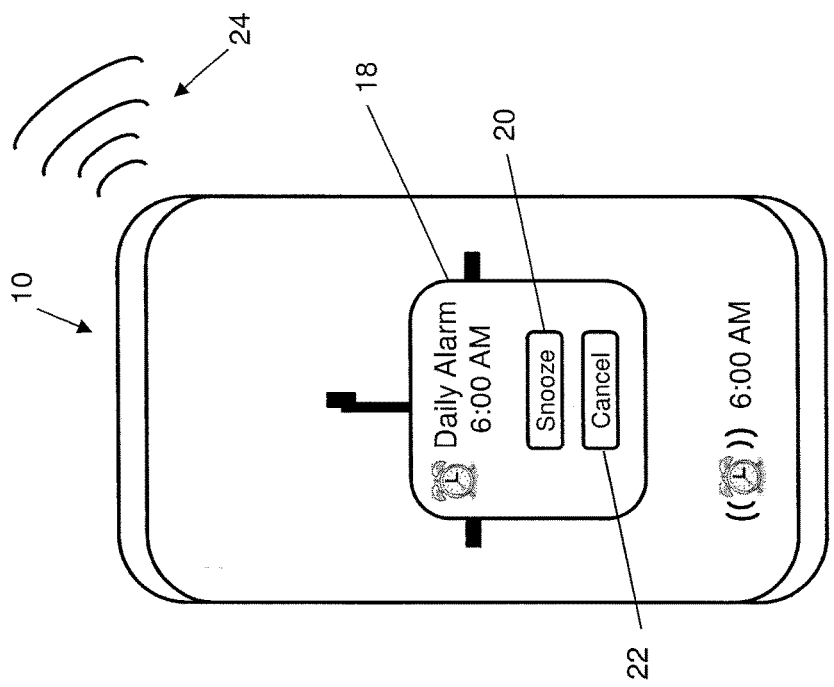
FIG. 2 is an illustrative view of a mobile device outputting an alarm notification.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein.

Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that while examples described herein relate to portable, handheld or otherwise "mobile" electronic devices, the principles discussed herein may equally apply to other types of electronic devices, such as alarm clock devices or other computing devices having clock and alarm functions.

Since an electronic device that is used as an alarm is often used for other features such as maintaining calendar events and enabling communications, the other features can be referenced to modify an alarm output to provide contextual awareness for the user of the alarm. For example, an alarm can be modified to convey that an urgent message has not been read or that a calendar event has been scheduled within a particular amount of time from when the alarm is to be activated.

Moreover, if normal notifications and alerts are suspended during a period prior to an alarm being activated, important or urgent communications may be missed. For example, if audible alerts are turned off, a phone call may be missed. Similarly, a chime or other sound associated with a calendar event reminder notification, an urgent email, or a communication from a particular contact, may also be missed if audible alerts are suspended or suppressed. In such scenarios, the only way for a user to determine whether an important type of event exists would be to turn off or cancel an alarm and check their device. However, there may be other scenarios where none of these predetermined types of events exist and thus the alarm can be deferred or "snoozed".

It has been found that if an urgent message or other event on the electronic device exists, a user may be more likely to want to wake up to address these events. The following provides a mechanism by which an electronic device can provide contextual awareness in conjunction with an alarm notification by either using a previously set/default alarm notification or a modified alarm notification depending on whether at least one predetermined type of event exists.

Since an alarm may be extended by selecting a snooze function, the following also enables a determination to be made as to whether any of the predetermined types of events have occurred between the time of the initial alarm and when a snooze alarm notification is to be activated. In this way, recent activity can be conveyed to the user via a modification (or absence of a modification) to the alarm notification.

Figure 1:
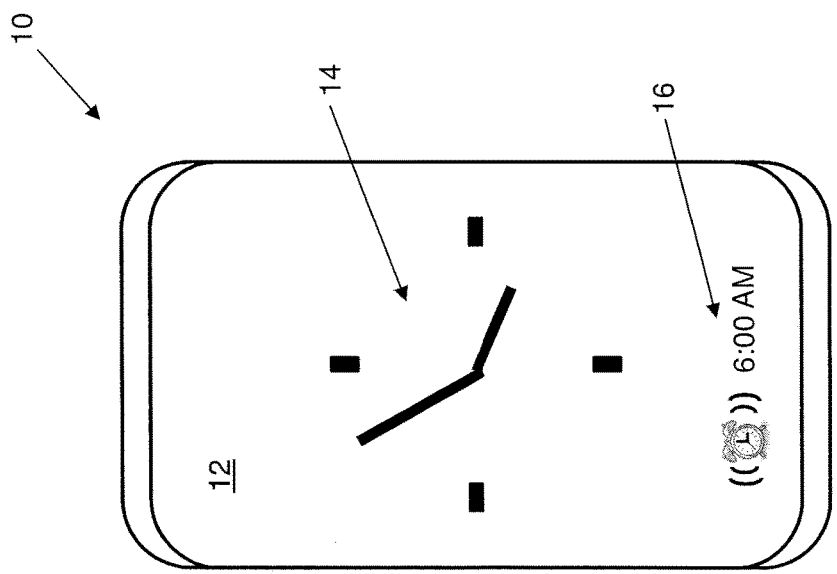
FIG. 1 is an illustrative view of a mobile device displaying a clock application user interface.

Turning now to FIG. 1, a mobile device 10 is shown. The mobile device 10 includes a display screen 12 displaying a clock element 14. In the example shown in FIG. 1, the clock element 14 is displayed as a prominent visual element to allow the current time to be viewed with minimal effort. The clock element 14 may be shown in this way when accessing a clock application user interface, or when the mobile device 10 is operating in a bedtime mode. Other properties may be associated with such a bedtime mode, for example, lowering an illumination level, and suspending or suppressing alerts and notifications while the bedtime mode is active. Also being displayed on the display screen 12 is an alarm time indicator 16 identifying when the next alarm will be activated or triggered. In the example shown in FIG. 1, the next alarm time is showing as 6:00 AM. It can be appreciated that when an alarm is to be activated, an audible alert associated with the alarm may bypass any restrictions or suppression of audible notifications while the mobile device 10 is, for example, in a bedtime mode.

FIG. 2 illustrates an example of an alarm activation wherein the mobile device 10 displays an alarm prompt 18 indicating that the time of the alarm has arrived and providing a snooze button 20 and a cancel button 22. The snooze button 20 enables a user to extend or defer the alarm for a predetermined amount of time, typically referred to as a snooze function or snooze operation. The cancel button 22 may be selected to turn off the currently activated alarm, e.g., to acknowledge the alarm at "wake up" or in association with another event or reminder for an event or activity. The mobile device 10 typically emits a audible alert 24 at the same time as displaying the alarm prompt 18 in order to alert the user of the alarm time. It can be appreciated that the audible alert 24 is often used as a wake up notification to notify the user of a wake up time.

As discussed above, although the audible alert 24 may be selected from a number of alarm types (e.g., to play different chimes or tunes), the alarm notification in general is independent on other activities and events that may occur or exist on the mobile device 10. For example, during an overnight or early morning period, prior to the alarm being activated, urgent emails, phone calls, and other types of events may occur that the user may wish to know about right away, and may event affect whether or not a snooze function is used. Rather than having the user snooze or cancel an alarm and access other applications to determine if such events exist, the alarm notification can be modified to provide contextual awareness based on a determination of whether predetermined types of events exist on the mobile device 10, using information available on the mobile device 10. In this way, the user can be notified not only of an alarm time, but also whether there are messages or other events to attend to, without having to access other applications.

Modifications to the alarm notification can be applied to either the visual aspect of the notification, the audible aspect of the notification, or both. To provide the contextual awareness discussed above, a different alarm prompt 18 or equivalent visual alarm notification can be used when at least one of the predetermined types of events exists. For example, as an alarm time approaches, the mobile device 10 may, upon determining that at least one urgent unread message exists, use a red alarm prompt 18 to highlight the fact that an urgent unread message is waiting. Similarly, other event types may cause the alarm notification to be modified, such as missed phone calls, calendar reminders that have not been acknowledged, calendar events that are scheduled within a predetermined amount of time, messages from predetermined contacts have been received, etc.

The same types of events can also cause the audible alert 24 to be modified. In one example, a different alarm chime or tune may be used when at least one predetermined event type exists. The different alarm chime or tune may be a relatively louder or jarring sound when compared to a smooth or pleasant sound used when the predetermined types of events do not exist.

In another example, the audible alert 24 can be modified to include different sounds according to which of the predetermined types of events exist. In this way, not only can the existence of these predetermined types of events be conveyed to the user, but the alarm notification can also be tailored to further convey what type of event has been found. To vary the alarm notification in this way, the audible alert 24 can include multiple audio "tracks", wherein each of the tracks is either enabled or disabled according to which type of event exists. For example, a drum track may be mapped to urgent or important emails, a bass track may be mapped to missed phone calls and/or the existence of voicemails, and a guitar track may be played regardless. In this example, if the audible alert 24 includes only a guitar track, the user can ascertain that no important or urgent events require their attention and may select the snooze button 20 to extend the alarm. On the other hand, if one or more of the drum and bass tracks are played, the user can ascertain that either an urgent email has been received, a phone call has been missed, or both, and act accordingly. Other types of tracks could also be used, for example, different nature sounds. The audible alert 24 may therefore include a plurality of versions or variations that each map to a particular type of event, one of the versions being associated with a normal or non-urgent alarm.

Figure 3:
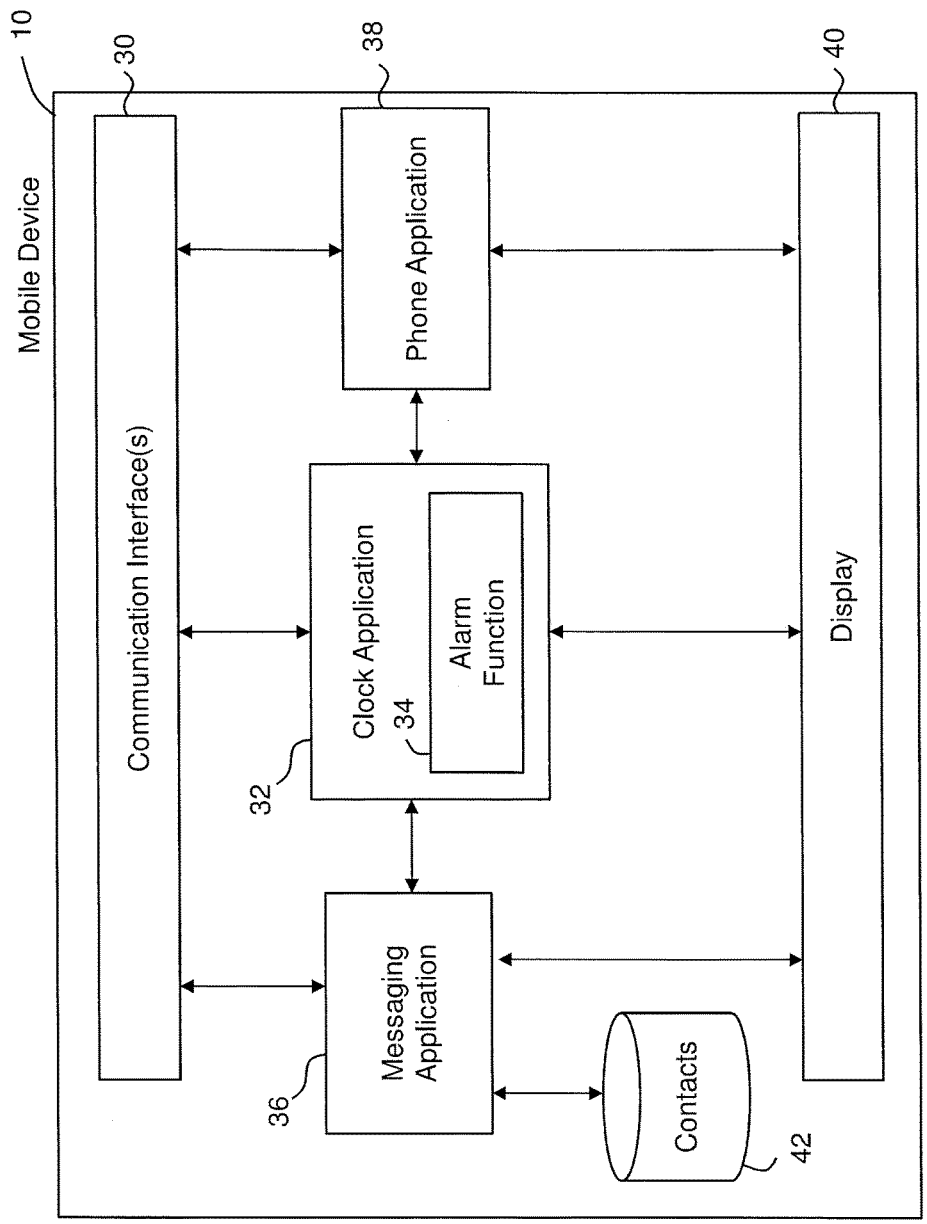
FIG. 3 is a block diagram of an example of a configuration for a mobile device.

FIG. 3 illustrates a block diagram of an example configuration for the mobile device 10. The mobile device 10 includes one or more communication interfaces 30 that enable the mobile device 10 to communicate with networks or other devices. It can be appreciated that the communication interfaces 30 may include wired, wireless, short-range or local, and long-range or wide area communication and/or access technologies, e.g., cellular, Wi-Fi, Bluetooth, near field communication (NFC), high definition multimedia interface (HDMI), universal serial bus (USB), etc. The mobile device 10 in this example includes a clock application 32 that includes an alarm function 34 for enabling a user to set an alarm time, e.g., as illustrated in FIGS. 1 and 2. Also shown in FIG. 3 are a phone application 38 and a messaging application 36, both of which are communicable with at least one of the communication interfaces 30 for sending and receiving respective communications. The mobile device 10 also includes a display component ("display 40") for rendering user interfaces and other visual elements on the display screen 12. The messaging application 36 may also include or otherwise have access to a data store of contacts 42 with which the mobile device 10 communicates.

Figure 4:
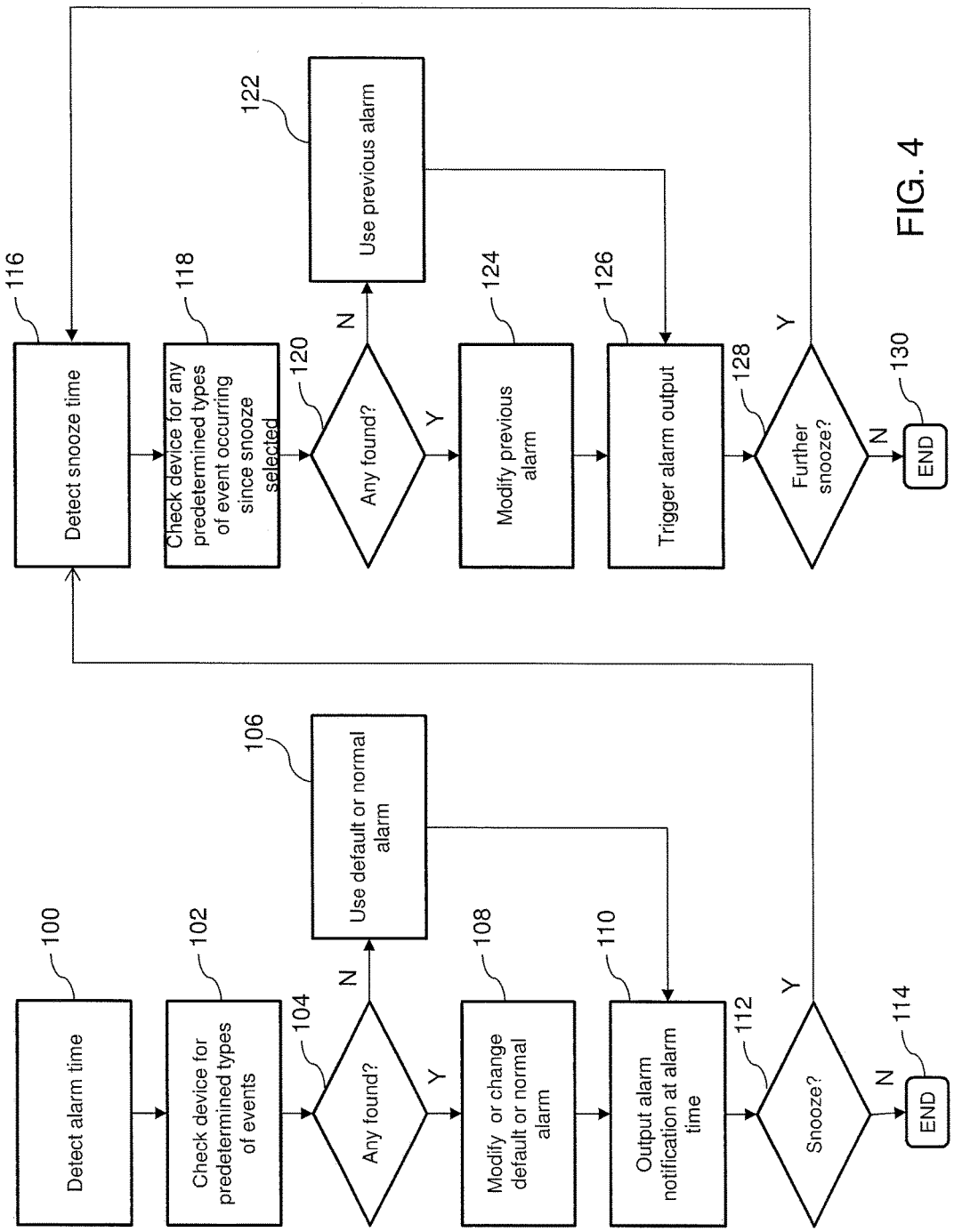
FIG. 4 is a flow diagram illustrating an example set of computer executable operations that may be performed in providing an alarm notification.

FIG. 4 illustrates an example of a set of computer executable operations that may be performed by the mobile device 10 in activating an alarm. At 100 the alarm function 34 detects an upcoming, imminent, approaching or immediate alarm time. In order to provide contextual awareness with the alarm output, the alarm function 34 checks the mobile device 10 at 102 to determine whether or not at least one predetermined event type exists. For example, the alarm function 34 may reference a message inbox to determine if any urgent or important emails have not been read, whether any phone calls have been missed, etc. The alarm function 34 may also be configured to check a calendar application to determine if any calendar reminders have not yet been acknowledged or if any calendar events are within a predetermined amount of time from when the alarm is to be activated, e.g., within 2 hours. The alarm function 34 determines at 104 whether or not at least one of the predetermined type of event exists. If not, the default, normal or otherwise previously set alarm notification is selected at 106. If at least one of the predetermined types of events is found, the previously selected alarm notification may be modified or changed at 108 to signify that a predetermined event does exist. For example, an urgent alarm notification type may be selected instead of the previously selected alarm notification, or a particular audio track may be added or removed from the alarm notification.

At the designated alarm time, the alarm notification is output at 110. In the example shown in FIG. 4, the alarm notification includes an option to snooze or otherwise defer or extend the alarm (e.g., as shown in FIG. 2). If the snooze function is not selected, the alarm process ends at 114. If the snooze function is selected, the alarm notification is suspended until a "snooze time" is detected at 116, i.e. the deferred or extended alarm time. After detecting the snooze time has arrived or is approaching at 116, the alarm function checks the mobile device 10 to determine if any of the predetermined types of events have occurred since the snooze function was selected. The alarm function 34 determines at 120 whether or not at least one predetermined type of event has occurred in that time. For example, the alarm function 34 may re-check a message inbox or calendar application to determine if anything new has arrived or if the current time is approaching a calendar event that is now within the predetermined amount of time from when the alarm was activated. If no new events have occurred, the previously used alarm notification may be selected at 122.

It can be appreciated that the previously used alarm notification in this example would correspond to the modified alarm notification output at 110, since the events that triggered the modified alarm notification have likely not been acknowledged or otherwise viewed. The previous alarm selected at 122 may instead default to the normal or otherwise previously set alarm that would have been selected at 106, e.g., according to user preferences.

If at least one predetermined type of event has occurred since the snooze function was selected, the previous alarm used may be further modified at 124 to differentiate the initial alarm from the snooze alarm and signify the existence of a recently occurring event. For example, the volume of the previous alarm notification may be increased, a different alarm notification may be selected, or a different combination of audio tracks assembled. The alarm function 34 may then determine if the snooze function has been selected again at 128. If not, the alarm process ends at 130. If the snooze function is again selected, the operations described above may be repeated from operation 116.

In addition to modifying the alarm notification based on the nature of the event (e.g., urgency, associated application, etc.), one or more additional criteria may cause a modified alarm notification to be used. For example, the user may select an option to have any message or other communication from a particular contact 42 cause the alarm notification to be modified. FIG. 5 illustrates an example of a set of computer executable operations that may be performed in determining whether at least one of a predetermined event type exists or has occurred (e.g., during operations 102/104 and/or 118/120 in FIG. 4). In the example shown in FIG. 5, a hierarchy of determinations is used where the alarm function 34 first checks the device based on a set of general criteria, such as whether a received message has been marked urgent or important, whether a phone call has been missed, whether a calendar reminder has not been acknowledged, whether a calendar event is approaching within a predetermined amount of time, etc.

If at least one event is found that matches the general criteria, the alarm notification is set to be modified at 154. If no events match the general criteria, the alarm function 34 may then apply a secondary set of criteria that are associated with preferences or selectable options at 156. The preferences or selectable options may overlap with the general criteria and may also capture exceptions based on other criteria. The preferences or operations may be user-selected, associated with a profile or theme, etc. The preferences and/or options enable further customization of the alarm notification. For example, a user that is travelling and wishes to know if a spouse or child has messaged or called them while they were sleeping, the alarm notification can be modified to indicate so, regardless of whether the message is marked as urgent or important. Other examples include an employee on call who may receive a message or phone call before they are scheduled to wake up to notify them of work for the coming day, a user who wishes to be notified of poor weather or traffic conditions as detected from a feed or alert received by the mobile device 10, students or professionals who have schedule changes made while they were sleeping, etc.

The alarm function 34 may therefore determine at 158 whether or not any events meet or satisfy the criteria associated with the preferences or options. If none of the secondary criteria are met, the alarm notification is set to not be modified (or further modified) at 160. If at least one of the secondary criteria are met, the alarm is modified at 154.

It can be appreciated that preferences may also be applied to the general criteria. For example, rather than modifying the alarm for any missed phone call, only missed phone calls that result in a voicemail would trigger the modified alarm.

FIG. 6 illustrates an example of an alarm notification preferences user interface 200 that may be invoked by a user to set or modify preferences. In the example shown in FIG. 6, the user interface includes a Select contact button 202 which when selected enables selection of one or more contacts 42 to be added to a list 204 of contact exceptions. For example, as illustrated in FIG. 6, User A and User B have been added to list 204 such that any message or other communication associated with those users would cause the alarm notification to be modified as herein described. One or more other selectable preferences may also be provided. In the example shown in FIG. 6, a checkbox 206 is included in the user interface 200 which when selected causes the alarm notification to be modified if any message of Type A (e.g., instant messages, social media posts, etc.) are received. As discussed above, various other selectable preferences may be used to dictate when and under what circumstances the alarm notification is modified, including message content or subject filters, message urgency, calendar/schedule changes, weather or traffic updates, social media postings or alerts, etc.

It has also been recognized that modified alarm notifications can be used as alerts triggered based on the detection of at least one predetermined type of event. In other words, an alarm can be created and/or set and a modified alarm notification can be used based on detection of a predetermined type of event. For example, the user may wish to have an alarm activate when they receive emails with particular subject lines, messages or phone calls from particular contacts 42, etc. In such an example, operations 102-110 may be performed periodically to determine if a new alarm should be created and activated, wherein operation 106 would result in a no alarm scenario. By using the same type of modified alarm notifications, the user is provided with familiar contextual awareness about predetermined types of events as they happen, in addition to those that occur prior to a previously set alarm.

FIG. 6 illustrates an example preference that can be used to activate an alarm trigger based on a predetermined event type. A check box 208 may be selected to activate the new alarm trigger and a set trigger button 210 is provided to enable the user to specify content, contacts, sources, etc. that would trigger the alarm. Various other options can be provided such as how many events need to be detected before triggering the alarm, when the alarm should be activated relative to the detection of the events, conditions when the alarm should not be activated or should be deferred, etc.

A Save button 212 is provided to enable the user to save any changes to the preferences, and a Cancel button 214 enables the user to cancel or discard any changes that may have been made since the user interface 200 was invoked.

Accordingly, there is provided a method of operating an electronic device, the method comprising: prior to activating an alarm on the electronic device, determining, from data stored on the electronic device, whether at least one of a predetermined type of event exists; and outputting a first modified alarm notification to indicate a relatively more urgent alarm if at least one of the predetermined type of event exists.

There is also provided an electronic device comprising a processor, memory, and at least one output device for providing an alarm notification, the memory comprising computer executable instructions for causing the processor to: prior to activating an alarm on the electronic device, determine, from data stored on the electronic device, whether at least one of a predetermined type of event exists; and output a first modified alarm notification to indicate a relatively more urgent alarm if at least one of the predetermined type of event exists.

There is also provided a computer readable storage medium comprising computer executable instructions for: prior to activating an alarm on the electronic device, determining, from data stored on the electronic device, whether at least one of a predetermined type of event exists; and outputting a first modified alarm notification to indicate a relatively more urgent alarm if at least one of the predetermined type of event exists.

Figure 7:
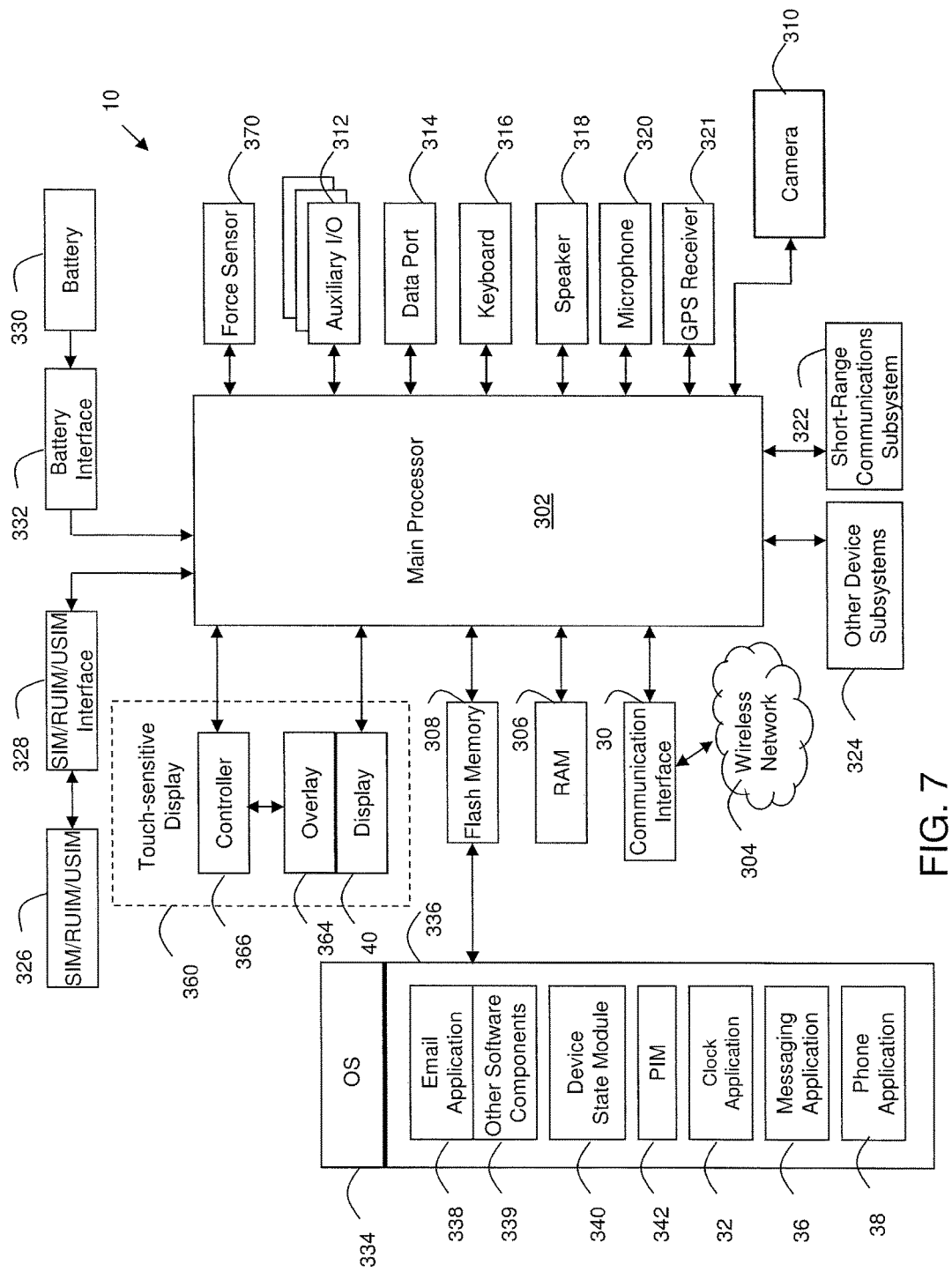
FIG. 7 is a block diagram of an example of a configuration for a mobile device.

Referring to FIG. 7, to further aid in the understanding of the example electronic devices described above, shown therein is a block diagram of an example configuration of a device configured as a "mobile device", referred to generally as "mobile device 10". The mobile device 10 includes a number of components such as a main processor 302 that controls the overall operation of the mobile device 10. Communication functions, including data and voice communications, are performed through at least one communication interface 30. The communication interface 30 receives messages from and sends messages to a wireless network 304. In this example of the mobile device 10, the communication interface 30 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 30 with the wireless network 304 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, a camera 310, short-range communications subsystem 322, and other device subsystems 324. Some of the subsystems of the mobile device 10 perform communication-related functions, whereas other subsystems may provide "resident" or on-device functions. By way of example, the touch-sensitive display 360 and the keyboard 316 may be used for both communication-related functions, such as entering a text message for transmission over the wireless network 304, and device-resident functions such as a calculator or task list. In one example, the mobile device 10 can include a non-touch-sensitive display in place of, or in addition to the touch-sensitive display 360. For example the touch-sensitive display 360 can be replaced by a display 40 that may not have touch-sensitive capabilities.

The mobile device 10 can send and receive communication signals over the wireless network 304 after required network registration or activation procedures have been completed. Network access is associated with a subscriber or user of the mobile device 10. To identify a subscriber, the mobile device 10 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 32, 36 and 38. The operating system 334 and the software components 336 to 342, 32, 36 and 38, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 32, 36 and 38, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, a clock application 32, a messaging application 36, and a phone application 38. An email application 338 can be any suitable software program that allows a user of the mobile device 10 to send and receive electronic messages, wherein messages are typically stored in the flash memory 308 of the mobile device 10. The messaging application 36 is an example of another application that may be used for sending and receiving messages, e.g., instant messaging, text messaging, social media messaging, etc. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 304.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 304, the auxiliary I/O subsystem 312, the data port 314, the short-range communications subsystem 322, or any other suitable device subsystem 324.

The data port 314 can be any suitable port that enables data communication between the mobile device 10 and another computing device. The data port 314 can be a serial or a parallel port. In some instances, the data port 314 can be a USB or HDMI port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 40 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 40 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the mobile device 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of operating an electronic device with an alarm function, the method comprising the following steps performed by the electronic device:
    detecting an imminent alarm time;
    prior to activating the alarm function to output a previously set first alarm notification notifying a user of the alarm time on the electronic device, accessing at least one of a phone application, a messaging application and a calendar application residing on the electronic device;
    determining, from the at least one of the phone application, the messaging application and the calendar application, whether an alarm modification threshold of at least two detected events of a predetermined type requiring the user's attention has been satisfied, where each of the at least two detected events is one of a missed communication and an un-acknowledged calendar reminder;
    in response to determining that the alarm modification threshold has been satisfied:

modifying the alarm function by replacing the previously set first alarm notification with a second alarm notification that is different than the previously set first alarm notification, the first alarm notification being absent from the second alarm notification, and outputting the second alarm notification notifying the user of both the alarm time and the events requiring the user's attention; and in response to determining that the the alarm modification threshold has not been satisfied, outputting the first alarm notification.

2. The method of claim 1, further comprising:

detecting selection of a snooze function displayed with one of the previously set first alarm notification and the second alarm notification;

prior to activating a snooze alarm notification, determining, from the at least one of the phone application, the messaging application, and the calendar application, whether at least one of the two detected events has occurred after the snooze function was selected;

outputting a same alarm notification as that used prior to detecting selection of the snooze function if the predetermined type of event has not occurred after the snooze function was selected; and outputting a third alarm notification if at least one of the two detected events has occurred since the snooze function was selected, the third alarm notification being different than an alarm notification used prior to selecting the snooze function, where the alarm notification used prior to the snooze function is absent from the third alarm notification.

3. The method of claim 1, wherein activating the alarm modifies a mode of the electronic device from a bedtime mode to a normal mode.

4. The method of claim 3, wherein at least one event notification associated with the at least one predetermined type of event is suspended during the bedtime mode.

5. The method of claim 1, further comprising enabling the at least one predetermined event type to be defined.

6. The method of claim 5, wherein the enabling comprises displaying an alarm preferences user interface.

7. The method of claim 1, wherein the alarm is activated based on whether the at least one predetermined type of event exists.

8. An electronic device comprising a processor, memory, an alarm function and at least one output device for providing an alarm notification, the memory comprising computer executable instructions for causing the processor to:

detecting an imminent alarm time;

prior to activating the alarm function to output a previously set first alarm notification notifying a user of the alarm time, accessing at least one of a phone application, a messaging application, and a calendar application residing on the electronic device;

determining, from the at least one of the phone application, the messaging application, and the calendar application, that at least one predetermined type of event requiring the user's attention has been detected, the at least one predetermined type of event comprising at least one of a missed communication and an un-acknowledged calendar reminder;

in response to determining that the at least one predetermined type of event has been detected:

modifying the alarm function by replacing the previously set first alarm notification with a second alarm notification that is different than the first alarm notification, the first alarm notification being absent from the second alarm notification; and outputting the second alarm notification notifying the user of both the alarm time and the events requiring the user's attention;

detecting selection of a snooze function displayed with the second alarm notification;

in response to detecting selection of the snooze function, suspending the second alarm notification;

prior to activating a snooze alarm notification, determine, from the at least one of the phone application, the messaging application, and the calendar application, that the at least one predetermined type of event has occurred after the second alarm notification was suspended;

replacing the second alarm notification with a third alarm notification in response to the at least one predetermined type of event having occurred after the second alarm notification was suspended, the third alarm notification being different than the first and second alarm notifications; and outputting the third alarm notification.

9. The electronic device of claim 8, further comprising computer executable instructions for causing the processor to modify a mode of the electronic device from a bedtime mode to a normal mode in response to determining that the at least one predetermined type of event exists.

10. The electronic device of claim 8, further comprising computer executable instructions for causing the processor to enable the at least one predetermined event type to be defined.

11. The electronic device of claim 10, wherein the enabling comprises displaying an alarm preferences user interface.

12. The electronic device of claim 8, wherein the alarm is activated based on whether the at least one predetermined type of event exists.

13. A non-transitory readable computer readable storage medium comprising executable instructions for:

detecting an imminent alarm time;

prior to activating an alarm function to output a previously set first alarm notification notifying a user of the alarm time on an electronic device, accessing at least one of a phone application, a messaging application and a calendar application residing on the electronic device;

determining, from the at least one of the phone application, the messaging application and the calendar application, whether a number of detected events of a predetermined type satisfies an alarm modification threshold of at least two detected events of the ˆpredetermined type requiring the user's attention has been satisfied, where each of the number of at least two detected events is one of a missed communication and an un-acknowledged calendar reminder event, where the alarm is configured to present at least the previously set first alarm notification to a user of the electronic device;

in response to determining that the number of detected events satisfies the alarm modification threshold, threshold has been satisfied:

modifying the alarm function by replacing the previously set first alarm notification with a second alarm notification that is different than the previously set first alarm notification, the first alarm notification being absent from the second alarm notification, and outputting the second alarm notification notifying the user of both the alarm time and the events requiring the user's attention; and in response to determining that the number of detected events fails to satisfy the alarm modification threshold has not been satisfied, outputting the first alarm notification.

14. The computer readable storage medium of claim 13, further comprising instructions for:

detecting selection of a snooze function displayed with one of the previously set first alarm notification and the second alarm notification;

prior to activating a snooze alarm notification, determining, from the at least one of the phone application, the messaging application and the calendar application, whether at least one of the predetermined type of event has occurred after the snooze function was selected;

outputting a same alarm notification as that used prior to detecting selection of the snooze function if the predetermined type of event has not occurred after the snooze function was selected; and outputting a third alarm notification if at least one of the predetermined type of event has occurred since the snooze function was selected, the third alarm notification being different than an alarm notification used prior to selecting the snooze function, where the alarm notification used prior to the snooze function is absent from the third alarm notification.

\* \* \* \* \*